(12) United States Patent
Barber et al.

(10) Patent No.: US 7,296,751 B2
(45) Date of Patent: Nov. 20, 2007

(54) IMAGING MODULE FOR OPTICAL READER

(75) Inventors: Charles P. Barber, Fayetteville, NY (US); Carl W. Gerst, III, Skaneateles, NY (US); Vivian L. Hunter, Baldwinsville, NY (US); Melvin D. McCall, Homer, NY (US); Bruce L. Hahn, Syracuse, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 141 days.

(21) Appl. No.: 10/613,208

(22) Filed: Jul. 3, 2003

(65) Prior Publication Data

US 2004/0195328 A1 Oct. 7, 2004

Related U.S. Application Data

(63) Continuation of application No. 09/411,936, filed on Oct. 4, 1999.

(51) Int. Cl.
*G06K 7/10* (2006.01)

(52) U.S. Cl. .................. 235/462.43; 235/462.41; 235/472.01; 235/383

(58) Field of Classification Search ............... 235/383, 235/462.43, 462.41, 462.42, 462.2, 462.21, 235/462.24, 472.01
See application file for complete search history.

(56) References Cited

U.S. PATENT DOCUMENTS

| | | |
|---|---|---|
| 4,092,698 A | 5/1978 | Brefka |
| 4,158,194 A | 6/1979 | McWaters et al. |
| 4,315,245 A | 2/1982 | Nakahara et al. |
| 4,471,384 A | 9/1984 | Sato et al. |
| 4,818,847 A | 4/1989 | Hara et al. |
| 4,847,490 A | 7/1989 | Nishikama |
| 4,900,907 A | 2/1990 | Matusima et al. |
| 5,010,241 A | 4/1991 | Butterworth |
| 5,019,699 A | 5/1991 | Koenck |
| 5,059,778 A | 10/1991 | Zouzoulas et al. |
| 5,132,525 A | 7/1992 | Swartz et al. |
| 5,280,161 A | 1/1994 | Niwa |
| 5,280,162 A | 1/1994 | Marwin |
| 5,331,176 A | 7/1994 | Sant' Anselmo et al. |
| 5,359,185 A | 10/1994 | Hanson |
| 5,378,883 A | 1/1995 | Batterman et al. |

(Continued)

FOREIGN PATENT DOCUMENTS

DE 1 233 038 B 1/1967

(Continued)

OTHER PUBLICATIONS

U.S. Appl. No. 09/411,936, filed Oct. 4, 1999, Barber et al.

(Continued)

*Primary Examiner*—Karl D. Frech
(74) *Attorney, Agent, or Firm*—Wall Marjama & Bilinski LLP

(57) ABSTRACT

The present invention relates to an apparatus packaging components of an optical reading device which may include illumination optical elements, receive optical elements, and signal processing elements. In one embodiment a single circuit board can carry multiple elements such as an image sensor together with illumination elements. In one embodiment, a control circuit can be provided that is coupled to a light source and an image sensor.

48 Claims, 7 Drawing Sheets

U.S. PATENT DOCUMENTS

| | | | |
|---|---|---|---|
| 5,420,411 A | 5/1995 | Salatto et al. |
| 5,449,892 A | 9/1995 | Yamada |
| 5,468,950 A | 11/1995 | Hanson |
| 5,473,149 A | 12/1995 | Miwa et al. |
| 5,476,387 A * | 12/1995 | Ramey et al. | ............ 439/76.1 |
| 5,484,994 A | 1/1996 | Roustaei |
| 5,504,317 A | 4/1996 | Takahashi |
| 5,504,367 A | 4/1996 | Arackellian et al. |
| 5,510,607 A | 4/1996 | Ishikawa |
| 5,550,364 A | 8/1996 | Rudeen |
| 5,550,368 A | 8/1996 | Roustaei |
| 5,572,006 A | 11/1996 | Wang et al. |
| 5,598,007 A | 1/1997 | Bunce et al. |
| 5,684,104 A | 11/1997 | Funk et al. |
| 5,684,290 A | 11/1997 | Arackellian et al. |
| 5,697,699 A | 12/1997 | Seo et al. |
| 5,703,349 A | 12/1997 | Meyerson et al. |
| 5,734,153 A | 3/1998 | Swartz et al. |
| 5,736,725 A | 4/1998 | Danielson |
| 5,743,633 A | 4/1998 | Chau et al. |
| 5,745,176 A | 4/1998 | Lebens |
| 5,750,976 A | 5/1998 | Eastman et al. |
| 5,756,981 A | 5/1998 | Roustaei et al. |
| 5,763,864 A | 6/1998 | O'Hagan et al. |
| 5,783,811 A | 7/1998 | Feng et al. |
| 5,786,582 A | 7/1998 | Roustaei et al. |
| 5,793,033 A | 8/1998 | Feng |
| 5,804,809 A | 9/1998 | Eastman et al. |
| 5,818,028 A | 10/1998 | Meyerson et al. |
| 5,821,513 A | 10/1998 | Ohagan |
| 5,821,518 A | 10/1998 | Sussmeier et al. |
| 5,837,985 A | 11/1998 | Karpen |
| 5,841,121 A | 11/1998 | Koenck |
| 5,850,078 A | 12/1998 | Giordano et al. |
| 5,872,354 A | 2/1999 | Hanson |
| 5,877,487 A | 3/1999 | Tani et al. |
| 5,880,452 A * | 3/1999 | Plesko | ............ 235/472.01 |
| 5,886,338 A | 3/1999 | Arackellian et al. |
| 5,894,348 A | 4/1999 | Bacchi et al. |
| 5,912,451 A | 6/1999 | Gurevich et al. |
| 5,917,171 A | 6/1999 | Sasai |
| 5,920,061 A | 7/1999 | Feng |
| 5,942,743 A | 8/1999 | Schmidt et al. |
| 5,949,057 A | 9/1999 | Feng |
| 5,962,836 A | 10/1999 | Tani et al. |
| 5,992,744 A | 11/1999 | Smith et al. |
| 5,992,746 A | 11/1999 | Suzuki |
| 5,992,751 A | 11/1999 | Laser |
| 5,992,753 A | 11/1999 | Xu |
| 6,019,286 A | 2/2000 | Li et al. |
| 6,029,893 A | 2/2000 | Tan et al. |
| 6,034,379 A | 3/2000 | Bunte et al. |
| 6,039,255 A | 3/2000 | Seo |
| 6,042,013 A | 3/2000 | Fork |
| 6,045,047 A | 4/2000 | Pidhirny et al. |
| 6,052,236 A | 4/2000 | Nakasuji et al. |
| 6,060,722 A | 5/2000 | Havens et al. |
| 6,062,475 A | 5/2000 | Feng |
| 6,092,728 A | 7/2000 | Li et al. |
| 6,105,869 A | 8/2000 | Scharf et al. |
| 6,119,939 A | 9/2000 | Schwartz et al. |
| 6,123,263 A | 9/2000 | Feng |
| 6,129,276 A | 10/2000 | Jelen et al. |
| 6,141,046 A | 10/2000 | Roth et al. |
| 6,164,544 A | 12/2000 | Schwartz et al. |
| 6,168,079 B1 | 1/2001 | Becker et al. |
| 6,179,208 B1 | 1/2001 | Feng |
| 6,223,986 B1 | 5/2001 | Bobba et al. |
| 6,223,988 B1 | 5/2001 | Batterman et al. |
| 6,275,388 B1 | 8/2001 | Hennick et al. |
| 6,283,374 B1 | 9/2001 | Fantone et al. |
| 6,315,204 B1 | 11/2001 | Knighton et al. |
| 6,332,573 B1 | 12/2001 | Gu et al. |
| 6,340,114 B1 | 1/2002 | Correa et al. |
| 6,347,163 B2 | 2/2002 | Roustaei |
| 6,360,949 B1 | 3/2002 | Shepard et al. |
| 6,371,374 B1 | 4/2002 | Schwartz et al. |
| 6,398,112 B1 | 6/2002 | Li et al. |
| 6,550,679 B2 | 4/2003 | Hennick et al. |
| 6,601,768 B2 | 8/2003 | McCall et al. |
| 6,607,128 B1 | 8/2003 | Schwartz et al. |
| 6,629,641 B2 | 10/2003 | Tsikos et al. |
| 6,634,558 B1 | 10/2003 | Patel et al. |
| 6,661,521 B1 | 12/2003 | Stern |
| 6,669,093 B1 | 12/2003 | Meyerson et al. |
| 6,681,994 B1 | 1/2004 | Koenck |
| 6,688,523 B1 | 2/2004 | Koenck |
| 6,732,929 B2 | 5/2004 | Good et al. |
| 6,786,414 B2 | 9/2004 | Tsikos et al. |
| 6,808,114 B1 | 10/2004 | Palestini et al. |
| 6,817,525 B2 | 11/2004 | Piva et al. |
| 6,830,184 B2 | 12/2004 | Tsikos et al. |
| 6,837,437 B2 | 1/2005 | Tsikos et al. |
| 6,843,417 B1 | 1/2005 | Philyaw et al. |
| 2003/0019934 A1 | 1/2003 | Hunter et al. |
| 2003/0029917 A1 | 2/2003 | Hennick et al. |
| 2003/0034394 A1 | 2/2003 | Gannon et al. |
| 2003/0062413 A1 | 4/2003 | Gardiner et al. |
| 2003/0089776 A1 | 5/2003 | Hennick et al. |
| 2003/0213847 A1 | 11/2003 | McCall et al. |

FOREIGN PATENT DOCUMENTS

| | | |
|---|---|---|
| DE | 1240 149 B | 5/1967 |
| DE | 24 45727 A1 | 9/1974 |
| EP | 0 431 831 A1 | 6/1991 |
| EP | 0 516 927 A2 | 12/1992 |
| EP | 0 548 951 A2 | 6/1993 |
| EP | 0 905 537 A1 | 3/1999 |
| EP | 0 944 017 A2 | 9/1999 |
| EP | 0 974 824 A2 | 1/2000 |
| EP | 1 079 466 A2 | 2/2001 |
| EP | 1 111 538 A1 | 6/2001 |
| EP | 1 128 314 A1 | 8/2001 |
| EP | 1 128 315 A1 | 8/2001 |
| JP | 54-021869 | 2/1979 |
| JP | 54-021871 | 2/1979 |
| JP | 54-109425 | 8/1979 |
| JP | 56-101256 | 8/1981 |
| JP | 56-151140 | 11/1981 |
| JP | 61-231912 | 10/1986 |
| JP | 64-086220 | 3/1989 |
| JP | 02-041496 | 2/1990 |
| JP | 04-367085 | 12/1992 |
| JP | 05-096227 | 4/1993 |
| JP | 07-011942 | 1/1995 |
| JP | 09-035856 | 2/1997 |
| WO | WO94/27250 A1 | 11/1994 |
| WO | WO97/15024 A1 | 4/1997 |
| WO | WO97/28512 A1 | 8/1997 |
| WO | WO99/41545 | 8/1999 |
| WO | WO 01/13158 A1 | 2/2001 |
| WO | WO 01/26035 A2 | 4/2001 |

OTHER PUBLICATIONS

U.S. Appl. No. 10/613,208, filed Jul. 3, 2003, Barber et al.

PCT International Search Report. International App. #PCT/US02/07161. International Filing Date Aug. 3, 2002. International Pub. #WO 02/073953A2. (International Search Report, International Publication, PCT Written Opinion & Inter. Prelim. Exam Report att.).

PCT International Search Report. International App.#PCT/US00/27289. International Filing Date Oct. 4, 2000. International Pub.

WO 01/026036A3. (International Search Report, International Publication, PCT Written Opinion & Inter. Prelim. Exam Report att.).

The State Intellectual Property Office Of The People's Republic of China. China Application No. 00815975.0 filed Oct. 4, 2000. (Copy of Aug. 2, 2004 First Office Action attached).

Welch Allyn Data Collection, Inc. (D/B/A Hand Held Products). IMAGETEAM (TM) 4250 2D Series Image Engine Integration Manual. Revision A dated Jun. 20, 2000. Published in Skaneateles Falls, NY.

Institute of Electrical and Electronics Engineers, Inc., Eric R. Fossum, "Digital Camera System on a Chip," Reprint, IEEE Micro, vol. 18, No. 3, May/Jun. 1998, 9 pages.

Report by Applicants, Jul. 2006, "Photographs of Optical Reader," (Report contains series of photographs of SCANQUEST Optical Reader believed to be in public use more than one year prior to earliest claimed priority date).

* cited by examiner

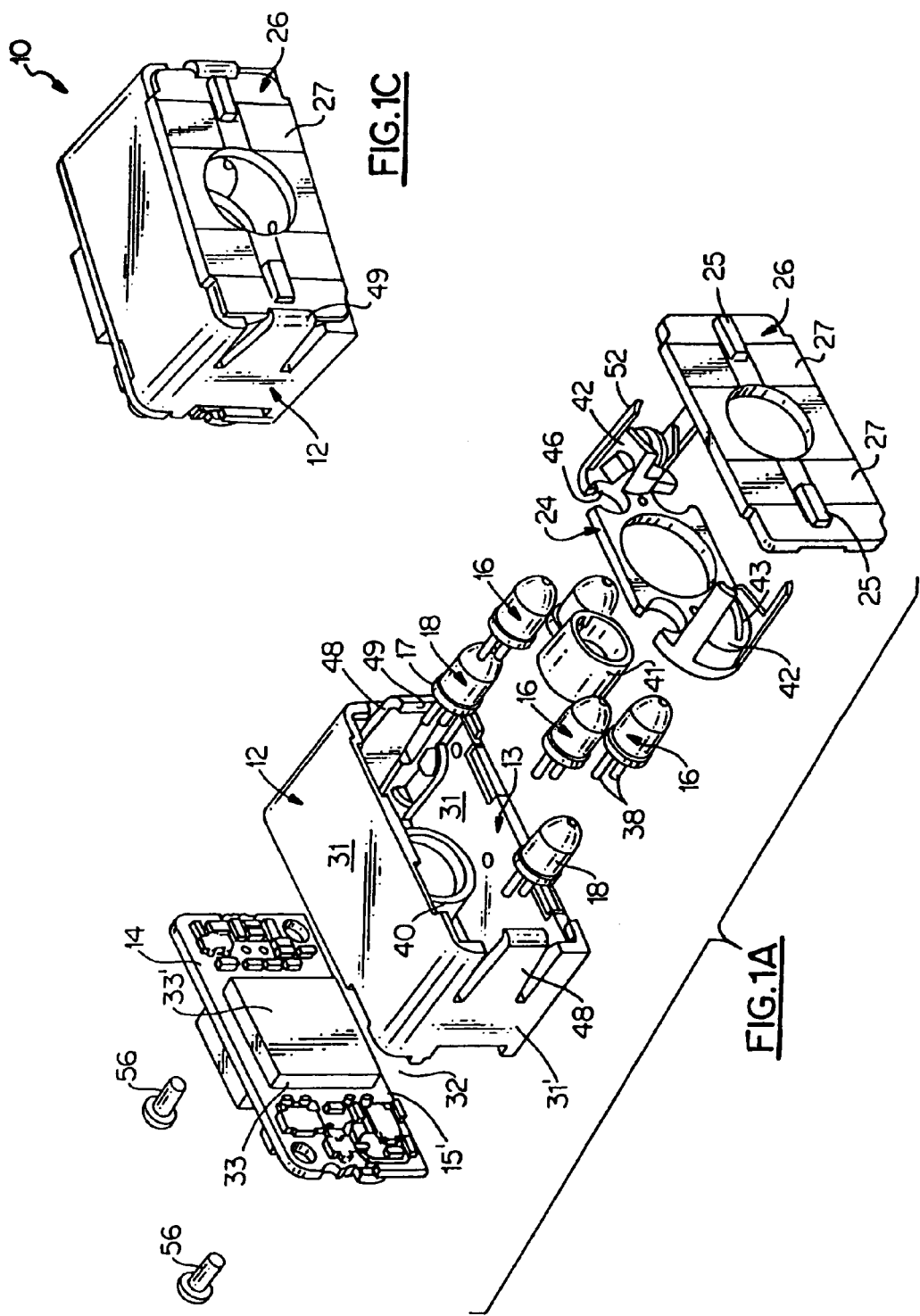

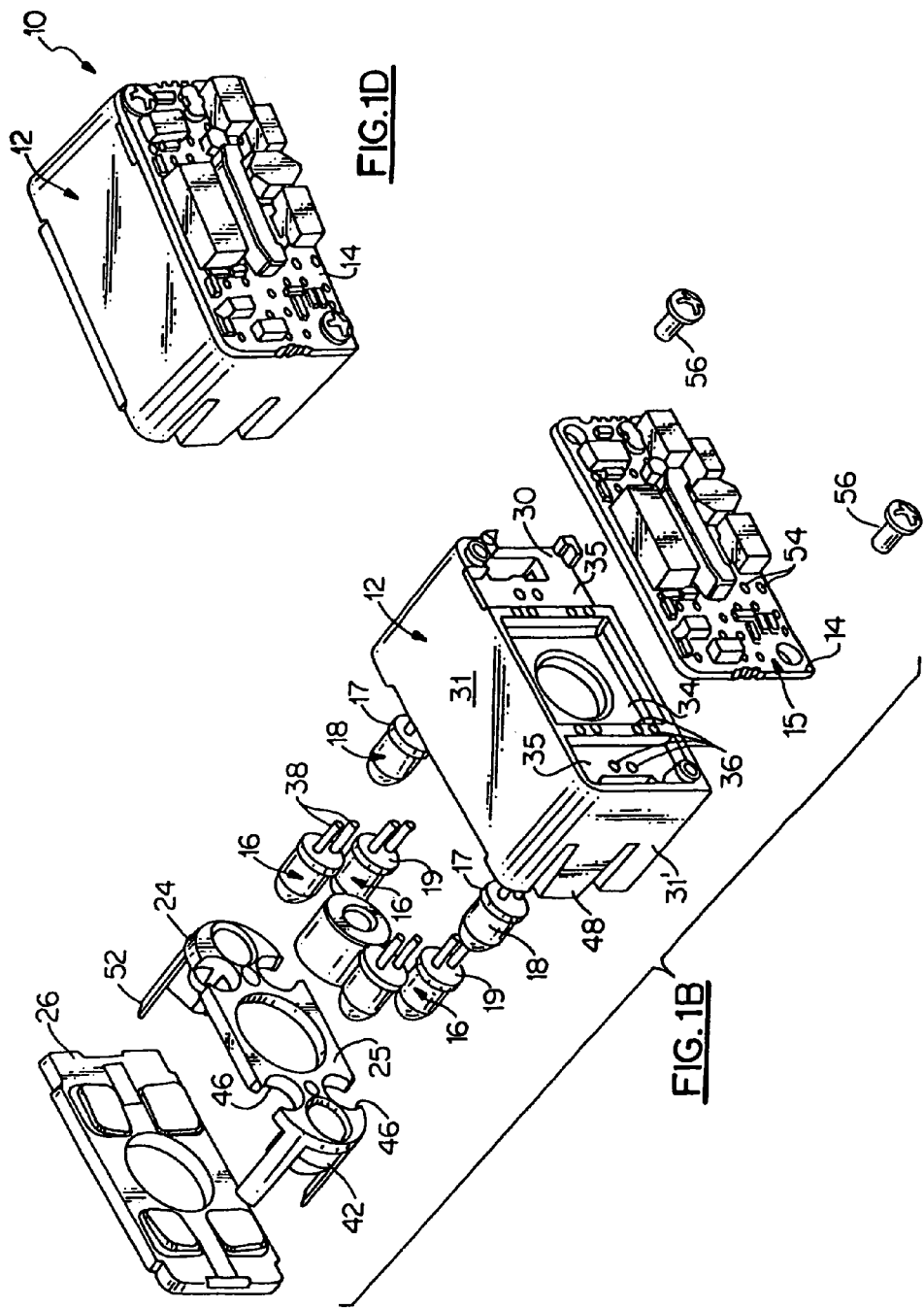

IMAGING MODULE FOR OPTICAL READER

CROSS REFERENCE TO RELATED APPLICATION

This is a continuation application of U.S. Ser. No. 09/411,936, filed Oct. 4, 1999 and entitled Imaging Module for Optical Reader, the contents of which are relied upon and incorporated herein by reference in its entirety, and the benefit of priority under 35 U.S.C. 120 is hereby claimed.

FIELD OF THE INVENTION

The present invention relates to optical reading devices in general and in particular to an apparatus for elements of an optical reader.

BACKGROUND OF THE INVENTION

Currently available optical readers include illumination elements, electronic signal processing, image capture and decoding circuitry that are carried by more than one circuit board. For, example, shown in U.S. Pat. No. 5,780,834 is an optical reader having numerous circuit boards, including an LED board for carrying illumination LEDs, an "imaging board" carrying an image sensor and circuitry for processing signals generated from the image sensor, and a "mother board" carrying image capture and decoding circuitry.

Assembly of the multiple circuit board arrangement of the prior art is time consuming and expensive. Assembly of a prior art reader requires mounting of separate circuit boards to separate internal structures of a reader, and providing electrical connection between the multiple circuit boards. In addition adding to being difficult to assemble, the multiple circuit board design imposes size requirements on the optical reader housing in which the electrical components are to be integrated.

There is a need for an improved packaging method and apparatus for packaging optical and electrical components of an optical reader.

BRIEF DESCRIPTION OF THE DRAWING

For a fuller understanding of the nature and objects of the invention, reference should be made to the following detailed description of a preferred mode of practicing the invention, read in connection with the accompanying drawings, in which:

FIG. 1A is a front perspective assembly diagram illustrating assembly of an image capture module according to the invention;

FIG. 1B is a rear perspective assembly diagram illustrating assembly of an image capture module according to the invention;

FIG. 1C is a front perspective view of an assembled image capture module according to the invention;

FIG. 1D is a rear perspective view of an assembled image capture module according to the invention;

FIG. 2A-2I are perspective views of various optical reader housings in which the invention may be incorporated;

DETAILED DESCRIPTION OF THE INVENTION

Figure 1E:
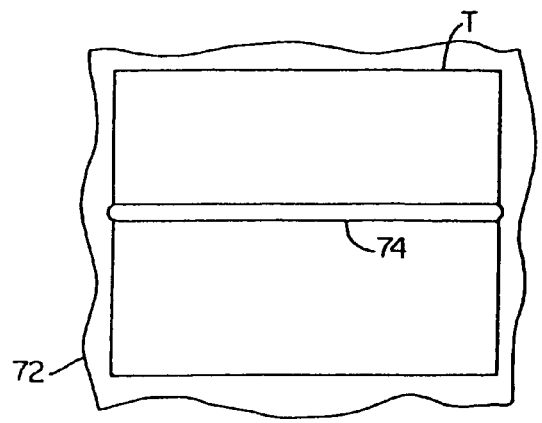
FIG. 1E is a representation of a preferred illumination and aiming pattern projected by a module in accordance with the invention.

According to its major aspects and broadly stated the present invention is a module for packaging optical illumination, optical receive, and electrical signal processing components of an optical reader.

The module includes a frame which carries a printed circuit board, preferably a printed circuit board (PCB) and various optical components. In one embodiment, the frame includes a back plate having a retainer for receiving an optical lens barrel, and a recess for receiving and aligning an image sensor which is carried by the PCB. The frame may also include resilient fingers which enable the frame to receive certain optical components of the module in an adhesiveless snap-fitting arrangement.

According to a preferred assembly method for assembling the module, the PCB is first mounted onto the frame's back plate such that the image sensor of the PCB is received and aligned by the recess of the back plate. Next, illumination and aiming LEDs are soldered to the PCB to mount the LEDs. As a space conserving measure, the LEDs may be mounted so that a portion of rear surfaces of the illumination LEDs oppose a portion of the top surface of the image sensor when mounted.

After the LEDs are mounted to the PCB, additional components are incorporated in the module. In a preferred embodiment, a lens barrel is incorporated in the retainer, then an aperture plate having domed apertures for shaping light rays emanating from the aiming LEDs is placed over the LEDs. Finally, a diffuser lens plate for diffusing light rays emanating from the illumination LEDs is snap-fit into the frame. By providing spacers between the aperture plate and the diffuser plate, both of the aperture plate and the diffuser plate are secured in a stationary position inside the module by snap fitting of the diffuser plate onto the frame without use of adhesives or any other mechanical securing apparatuses.

In addition to having diffusers for diffusing illumination light, the diffuser plate may also include lenses for focusing light generated by the aiming LEDs. In one embodiment of the invention, the aiming LEDs and their associated optics project a solitary horizontal aiming line onto a target in a field of view.

The printed circuit board may be a full function printed circuit board which carries a solid state image sensor and essentially the entirety of electronic circuitry required for supporting essentially all of the processing and control operations to be performed by the optical device in which the module is to be incorporated. Circuitry incorporated in the single PCB includes signal processing circuitry for processing signals generated from the image sensor, image capture circuitry for storing image data, and decoding and/or recognizing circuitry for decoding and/or recognizing indicia represented in image data that has been stored.

In order to accommodate the full function circuit board, the rear surface of the frame's back plate should be made to have a central recess for aligning and receiving the image sensor, and peripheral recesses for accommodating circuit elements such as electrical components and/or wiring which may emanate from the front surface of the full function printed circuit board.

The complementary components of the module are shaped so that the completed module exhibits a cubic rectangular form, thereby reducing the overall volume consumed by the entirety of optical components and at least the image sensing component of the reader in which the module is installed.

A major feature of the invention is the incorporation of essentially all of the illumination elements required of an optical reader, including illumination and aiming light sources, and an image sensor onto a single circuit board. This significantly simplifies assembly, reduces material consumption, and thereby reduces the overall cost of producing the module.

Another feature of the invention is the snap fitting arrangement between the plate components of the module and the frame. The snap fitting arrangement for mounting several components of the frame eliminates the need for adhesives or other mechanical mounting agents, simplifies assembly, and thereby further reduces costs.

Another feature of the invention is the positioning of the LEDs to partially oppose the image sensor when mounted. This feature reduces the required overall size of the module, thereby allowing incorporation of the module into smaller readers and further reducing costs.

Still another feature of the invention, in one embodiment, is the incorporation of essentially the entirety of electronic circuitry components required for essentially all of the signal processing and control operations required of the optical reader in which the module is to be incorporated in a single PCB. This feature enables essentially all of the electrical component required of an optical device in which the module is to be incorporated to be installed simply by installing the module in the device.

Another feature of the invention is the projection of a solitary horizontal aiming line by the module's aiming LEDs and their associated optics. The projection of a solitary horizontal aiming line for aiming reduces the space requirements of the aiming optics and reduces costs.

Yet another feature of the invention is the packaging of the entirety of the optical elements and at least the image sensor of the electrical components of an optical reader into a packaged module having a rectangular cube configuration. The rectangular cube configuration is stackable and highly space efficient and as such. enables simplified transport of the module and installation of reader optical and electrical components into reader housings of smaller size than was previously possible.

In addition to minimizing the size of the module, the module's configuration provides protection for internal components. The module's closed wall configuration provides a containment for internal components of the module, and substantially prevents outside objects from coming in contact with sensitive internal components of the module such as the module's image sensor and LEDs.

These and other details, advantages and benefits of the present invention will become apparent from the detailed description of the preferred embodiment herein below.

An embodiment of an imaging module 10 according to the invention is shown in FIGS. 1A through 1D. Imaging module 10 is specifically designed for use in an indicia reader such as a bar code reader, an optical character recognition (OCR) reader or in a reader having both bar code and OCR reading capabilities. However, it will be understood that features of module 10 may also find use in other devices requiring image capture including video cameras, digital cameras, and medical viewing instruments.

Module 10 includes mounting frame 12 which is adapted to receive both electrical components and optical components of an imaging system. Specifically, mounting frame 12 receives a circuit board, shown as being provided by a printed circuit board (PCB) 14, illumination LEDs 16, aiming LEDs 18, an aiming lens aperture plate 24 and diffuser plate 26. LEDs 16, 18 could be substituted for by such light sources as laser diodes, filament based lamps, other solid state light sources, and fiber optic illumination devices.

Referring now to specific attributes of frame 12, frame 12 includes a back plate 30 and sidewalls including top sidewalls 31 and side sidewalls 31'. Back plate 30 includes a recess 34 for receiving a solid state image sensor chip 32 and, in one embodiment, a plurality of pin holes 36 for receiving leads 38 of illumination and/or aiming light sources, normally provided by LEDs 16, 18. Back plate 30 may further include a retainer 40 for receiving a receive optics lens assembly 41 shown as being provided by a lens barrel, which may be installed in retainer 40 prior to or after any step in the assembly process which will be described herein below.

In assembling module 10, an assembler may first mount PCB 14 to back plate 30 with use of screws 56 or adhesives and then orients frame 12 so that opening 13 is exposed. When PCB 14 is mounted to back plate 30, image sensor 32 carried by PCB 14, is received and aligned by center recess 34 which is shaped complementarily with the shape of image sensor 32 as shown. After mounting PCB 14 to frame 12, an assembler mounts illumination LEDs 16 and aiming LEDs 18 to PCB 14.

To mount LEDs 16, 18 to PCB 14, an assembler pushes leads 38 of LEDs 16, 18 through aligned pin holes 36 and 54 of back plate 30 and PCB 14, then solders the LEDs 16, 18 to PCB 14. Preferably, an assembler first positions all of the LEDs 16, 18 in their respective pin holes before soldering any of them. In soldering LEDs 16, 18 rear surface 15 of PCB 14 should face in an orientation where it is easily accessed by an assembler. To the end that LEDs 16, 18 remain in their desired orientation substantially normal to PCB 14 during soldering, a fixture (not shown) shaped to receive LEDs 16, 18, of the type well known to persons skilled in the optical module assembly art can be temporarily applied over LEDs 16, 18 through the soldering process.

While back plate 30 of frame 12 is shown as having pin holes 36 it will be understood that the entire region of back plate 30 containing pin holes 36 and recess 34 could be eliminated leaving back plate 30 to consist essentially only of receive optical lens assembly retainer 40. In such an embodiment, a substantial portion of the front surface 15 of PCB 14 would be exposed to an assembler upon mounting of PCB 14 to frame 12. In the case that back plate 30 does not contain material defining pin holes 36, LEDs 16, 18 may be front mounted to front surface 15 of a PCB which in such an embodiment would not require pin holes for receiving LED leads 38.

An important feature of the invention is that leads 38 of illumination LEDs 16 are installed in a nearly abutting relation to sides 33 of image sensor 32 so that a portion of rear surfaces 19 of LEDs 16 oppose a portion of a front surface 33 of image sensor 32 when the LEDs 16 are completely installed. This arrangement reduces the size of module 12, enabling it to be installed in smaller sized optical readers.

After LEDs 16, 18 are mounted onto PCB 14, an assembler installs aperture plate 24 in frame 12 so that domes 42 of aperture plate 24 fit over aiming LEDs 18. Domes 42 of aperture plate should be opaque to substantially block all light emanating from aiming LEDs 18 except for light which exits domes 42 through slit apertures 43. Slit apertures 43 should be formed so that a desired shaped aiming pattern of illumination is projected onto a target, T. Preferably, aperture slits 43 are shaped rectangularly so that a horizontal line pattern is projected onto a target.

Referring to further aspects of aperture plate 24, aperture plate 24 includes cutaway sections 46 which provide clearance to allow plate 24 to be fit over illumination LEDs 16. The sidewalls of domes 42 and of cutaway sections 46 may or may not contact the LEDs they fit over. However, it is not necessary that the sidewalls of either domes 42 or cutaway sections 46 have any influence on the alignment or LEDs 16, 18 since LEDs 16, 18 are aligned in their desired orientation substantially normal to the surface 33 of image sensor 32 and PCB 14 by virtue of the fact that they are held in a desired orientation while being soldered and, in the embodiment shown, by virtue fact that the flat surfaces of LED bases 17 are biased against the flat surface of back plate 30 during the assembly process.

After aperture plate 24 is placed over LEDs 16, 18 and moved toward back plate 30, diffuser plate 26 is snap fit into frame opening 13 of frame 12. Diffuser plate 26 includes diffusers 27 for diffusing light emanating from illumination LEDs so that a target area, T, is substantially homogenously illuminated by light emanating from illumination LEDs 16. Resilient fingers 48 having hook ends 49 may be formed in top 31 or side 31 sidewalls of frame 12 to enable snap fitting of plate 26 onto frame 12. In the embodiment shown, an assembler snap fits plate 26 onto frame 12 by pulling back resilient fingers 48 and pushing plate 26 toward back plate 30 then releasing fingers 48 to lock plate 26 into a position inside module 10. Spacers 52 of aperture plate 24 (which in the alternative may be formed on plate 26) operate to bias aperture plate 24 toward back plate 30 when diffuser plate 26 is snap fit onto frame 12. When plate 26 is snap fit into frame 12, spacers 52 transfer the force imparted by fingers 48 on plate 26 to plate 24 to the end that both aperture plate 24 and diffuser plate 26 are firmly secured inside frame 12 without use of adhesives or outside mechanical securing apparatuses or agents such as screws or pins.

In addition to having diffusers 27 for diffusing light emanating from illumination LEDs 16, diffuser plate 26 may also include lenses 25 for focusing light emanating from aiming LEDs 18 as shaped by aperture slits 43 so that a focused narrow line is projected onto a target area T. A representation of a preferred illumination pattern projected by the illumination system of module 10 is shown in FIG. 1E. In FIG. 1E, area 72 represents the region of a target area T illuminated by illumination LEDs 16 while area 74 represents the region of the target area highlighted by aiming LEDs 18 and their associated optics. It is seen that aiming LEDs 18 and their associated optics preferably project a solitary horizontal line 74 onto a target area which is in contrast with the complex geometry aiming patterns of prior art 2D optical readers. The selection of a solitary horizontal aiming pattern reduces the size of module 10, as it eliminates the need to provide more than 2 light sources and/or optics for reflecting light generated from the aiming pattern light source or sources.

An important feature of the invention is that essentially all the illumination elements of a reader in which module 10 is to be incorporated are included on a single circuit board shown as being provided by PCB 14. This is in contrast to the design of the prior art reader shown in FIG. 3 in which illumination elements and image sensing elements are spread out over several circuit boards. In the prior art device shown in FIG. 3, an aiming illumination source 53 is mounted to a first circuit board 54, illumination LEDs are mounted to a second circuit board 56, while image sensor 32 is mounted to a third circuit board 58. The assembly of a module of this prior art design is difficult and requires material components not required by the design of the present invention including circuit boards 54, 56 and electrical connectors between the circuit boards such as connector 57. Providing a single circuit board that carries an image sensor, illumination LEDs, and aiming LEDs significantly simplifies assembly, reduces material consumption and thereby reduces the overall cost of producing the module.

Another important aspect of the invention, in one embodiment, is that essentially all electronic circuitry supporting the data processing operations required of module 10 are located on single, full function PCB 14, including circuitry for processing signals generated from image sensor 32, circuitry for capturing image data into a memory device, circuitry for decoding and/or recognizing indicia represented in captured image data. Circuitry for supporting serial transfers of data to peripheral devices may also be carried by PCB 14.

The all in one PCB arrangement of the present invention is in contrast to the traditional design in the prior art wherein circuitry for processing signals from an image sensor, circuitry for capturing and decoding image data and circuitry supporting serial interfacing with external devices are spread out over more than one circuit board.

Figure 3:
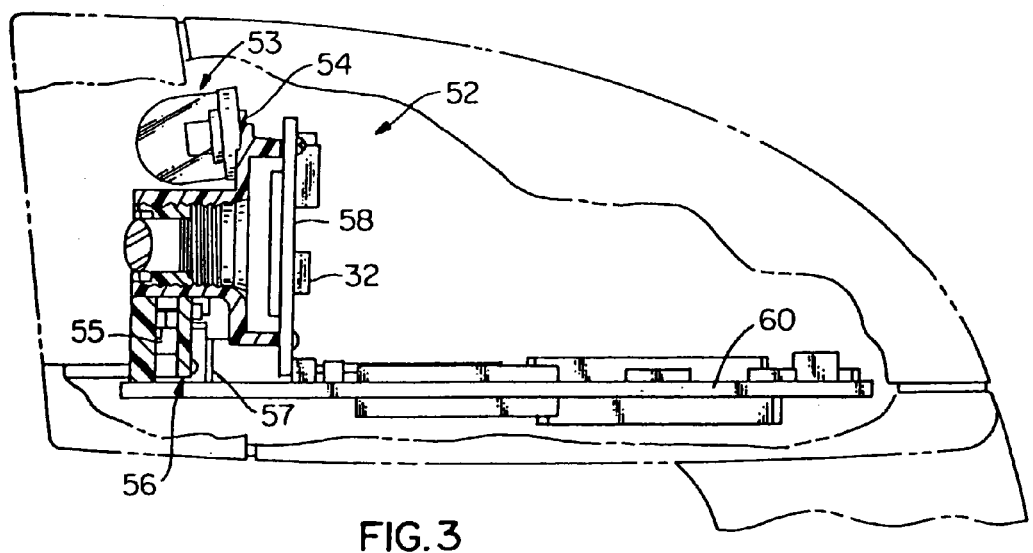
FIG. 3 is a side view of a prior art reader illustrating a prior art multiple circuit board arrangement.

In the design of the prior art reader shown in FIG. 3, a first vertically oriented circuit board 56 is provided for carrying circuitry for processing signals generated by an image sensor 32 and a second horizontally oriented circuit board 60, known as a "mother board" is provided for carrying circuitry for storing image data and for decoding symbologies.

The one PCB design of the present invention provides numerous advantages over the two PCB design of the prior art. The multiple circuit board arrangement of the prior art requires a complex assembly procedure wherein the first circuit board 58 is mounted to a first internal structure of the reader in which it is incorporated, the second circuit board is mounted to a second internal structure of the reader, and then the two circuit board are electrically connected. The separate horizontal and vertical orientations of the two circuit boards 58, 60 is inefficient in terms of space consumption and imposes restrictions on the configurations of housings in which the reader optical and electrical components may be incorporated. The one full function PCB design of the present invention does not exhibit these disadvantages.

To the end that essentially the entirety of the required electronic circuitry of an optical reader can be packaged into a single printed circuit board, the back surface of the frame's back plate 30 should be configured to accommodate electrical components that will extend forward from the front surface 15 of PCB 14. Accordingly it is seen that the rear surface of back plate 30 includes a central recess 34 for aligning and receiving solid state image sensor 32 and peripheral recesses 35 for accommodating electrical circuitry such as components and/or conductors which may protrude from the front surface of PCB 14.

In addition to the features that have been described herein above, it will be seen that additional benefits are yielded by features relating to the overall shape and configuration of module 10. As best seen in FIGS. 1C and 1D, sidewalls 31 and 31' of frame 10, together with PCB 14 and plate 26 define a module having a substantially cubic rectangular overall form. The cubic rectangular form is highly space efficient relative to the form of optical reader imaging modules in the prior art. With reference again to FIG. 3 it is seen that the form of prior art imaging module 52 is highly irregular in that it contains members such as member 53 and member 56 that protrude extraneously from the major body of module 52. The volume conserving cubic rectangular configuration of the module of the present invention facilities incorporation of the module into optical reader housings of smaller interior volume than was possible with the irregular imaging module designs of the prior art.

The volume conserving cubic rectangular form of module, in addition to facilitating incorporation of the module into a smaller volume optical reader housings, renders the module easier to package. This is because the cubic rectangular form allows several modules to be stacked neatly on top of one another allowing more modules to be packaged in a certain sized container than was possible with modules of previous designs. The stackability of the modules also allows the modules to be packaged more securely without outside securing agents such as bubble paper and/or foam particles, since several modules can be packed in such a way that several modules impart stabilizing tensioning forces on one another. Packaging of several modules in a box or container containing several modules is an important consideration in the case that several modules 10 are to be transported from a first location where they are assembled to a second location where they are to be incorporated into several optical reader housings.

Another feature relating to the outer configuration of module 10, is that the defined outer walls of module 10 serve as a containment for protecting and preventing damage to relatively fragile and sensitive internal components of the module. In the prior art, with reference again to FIG. 3, it is seen that sensitive and fragile and sensitive components of module such as light source 53 and LED circuit board 56 extend extraneously from the major body of the module and as such, are susceptible to being brought in contact with external objects especially during transport and during installation of the module into a reader housing. In the embodiment shown in FIGS. 1A–1D, substantially all fragile sensitive components, including all light sources of module 10, and image sensor 32, are disposed inside a substantially rigid containment structure defined by sidewalls 31, 31' and PCB 12 and the combination of sidewalls 31, 31' and diffuser plate 26.

The substantially rigid containment of sensitive internal components of the module provided by the combination of sidewalls 31, 31' and PCB 14 and/or the combination of sidewalls 31, 31' and diffuser plate 26 eliminate the need to package the module with shock absorbing material such as bubble paper or foam particles during transport and allows the module to be safely transported from one location to another without substantial risk of damage to sensitive internal components.

Methods for making, and possible material compositions for various components of imaging modules are discussed in commonly assigned U.S. Ser. No. 09/312,479 incorporated herein by reference.

A block diagram illustrating one type of optical reading device in which the invention may be incorporated is described with reference to FIG. 1F.

Optical reader 110 includes an illumination assembly 120 for illuminating a target object T, such as a 1D or 2D bar code symbol, and an imaging assembly 130 for receiving an image of object T and generating an electrical output signal indicative of the data optically encoded therein. Illumination assembly 120 may, for example, include an illumination source assembly 122, such as one or more LEDs, together with an illuminating optics assembly 124, such as one or more reflectors, for directing light from light source 122 in the direction of target object T in module 10. The illumination assembly in the embodiment of FIGS. 1A–1D is provided entirely by LEDs 16. Illumination assembly 120 may be eliminated if ambient light levels are certain to be high enough to allow high quality images of object T to be taken. Imaging assembly 130 may include an image sensor 132, such as a 1D or 2D CCD, CMOS, NMOS, PMOS, CID OR CMD solid state image sensor, together with an imaging optics assembly 134 for receiving and focusing an image of object T onto image sensor 132. The array-based imaging assembly shown in FIG. 1F may be replaced by a laser array based imaging assembly comprising multiple laser sources, a scanning mechanism, emit and receive optics, at least one photodetector and accompanying signal processing circuitry.

Figure 1F:
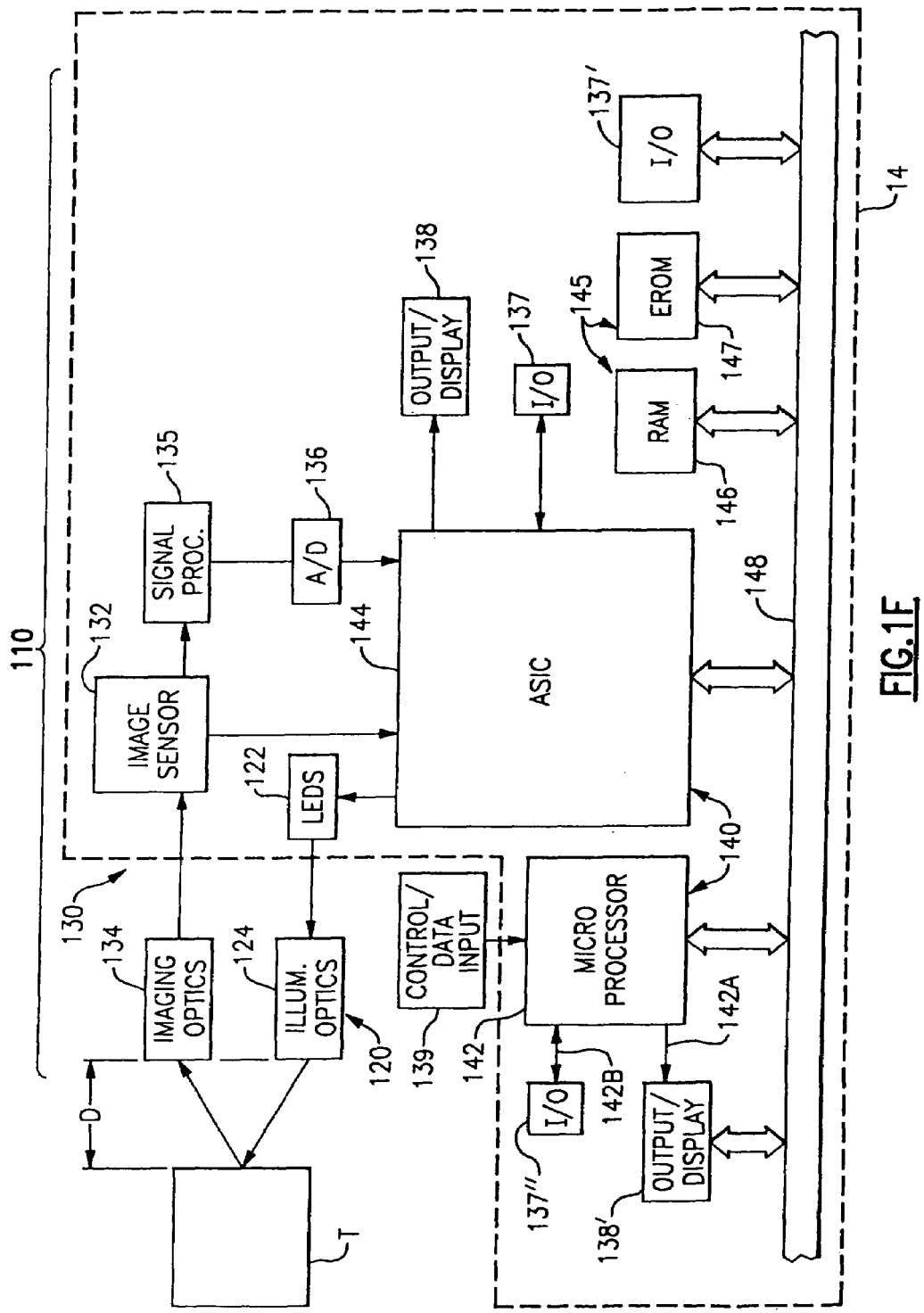
FIG. 1F is a block diagram for illustration of functional and control features of the invention.

Optical reader 110 of FIG. 1F also includes programmable control unit 140 which preferably comprises an integrated circuit microprocessor 142 and an application specific integrated circuit (ASIC 144). The function of ASIC 144 could also be provided by field programable gate array (FPGA). Processor 142 and ASIC 144 are both programmable control devices which are able to receive, output and process data in accordance with a stored program stored in memory unit 145 which may comprise such memory elements as a read/write random access memory or RAM 146 and an erasable read only memory or EROM 147. RAM 146 typically includes at least one volatile memory device but may include one or more long term non-volatile memory devices. Processor 142 and ASIC 144 are also both connected to a common bus 148 through which program data and working data, including address data, may be received and transmitted in either direction to any circuitry that is also connected thereto. Processor 142 and ASIC 144 differ from one another, however, in how they are made and how they are used.

More particularly, processor 142 is preferably a general purpose, off-the-shelf VLSI integrated circuit microprocessor which has overall control of the circuitry of FIG. 2, but which devotes most of its time to decoding image data stored in RAM 146 in accordance with program data stored in EROM 147. Processor 144, on the other hand, is preferably a special purpose VLSI integrated circuit, such as a programmable logic or gate array, which is programmed to devote its time to functions other than decoding image data, and thereby relieve processor 142 from the burden of performing these functions.

The actual division of labor between processors 142 and 144 will naturally depend on the type of off-the-shelf microprocessors that are available, the type of image sensor which is used, the rate at which image data is output by imaging assembly 130, etc. There is nothing in principle, however, that requires that any particular division of labor be made between processors 142 and 144, or even that such a division be made at all. This is because special purpose processor 144 may be eliminated entirely if general purpose processor 142 is fast enough and powerful enough to perform all of the functions contemplated by the present invention. It will, therefore, be understood that neither the number of processors used, nor the division of labor therebetween, is of any fundamental significance for purposes of the present invention.

With processor architectures of the type shown in FIG. 1F, a typical division of labor between processors 142 and 144 will be as follows. Processor 142 is preferably devoted primarily to such tasks as decoding image data, once such data has been stored in RAM 146, recognizing characters represented in stored image data according to an optical character recognition (OCR) scheme, handling menuing options and reprogramming functions, processing commands and data received from control/data input unit 139 which may comprise such elements as trigger 174 and keyboard 178 and providing overall system level coordination. Processor 144 is preferably devoted primarily to controlling the image acquisition process, the A/D conversion process and the storage of image data, including the ability to access memories 146 and 147 via a DMA channel. Processor 144 may also perform many timing and communication operations. Processor 144 may, for example, control the illumination of LEDs 122, the timing of image sensor 132 and an analog-to-digital (A/D) converter 136, the transmission and reception of data to and from a processor external to reader 110, through an RS-232, a network such as an ethernet, or a serial bus such as USB, (or other) compatible I/O interface 137 and the outputting of user perceptible data via an output device 138, such as a beeper, a good read LED and/or a display monitor which may be provided by a liquid crystal display such as display 182. Control of output, display and I/O functions may also be shared between processors 142 and 144, as suggested by bus driver I/O and output/display devices 137' and 138' or may be duplicated, as suggested by microprocessor serial I/O ports 142A and 142B and I/O and display devices 137" and 138'. As explained earlier, the specifics of this division of labor is of no significance to the present invention.

In accordance with a feature of one embodiment of the invention described with reference to FIGS. 1A-1D, essentially all of the electrical signal processing components described with reference to FIG. 1F may be carried by a single circuit board, PCB 14, as is indicated by dashed-in border 14, of FIG. 1F. In order to incorporate essentially all of the electrical signal processing components of FIG. 1E onto a single PCB 14, it is normally necessary to integrate several electrical components into a reduced number of electrical components. For example, using known integrated circuit fabrication techniques, components 142, 144, 146, and 147 and interfaces 137, 137', and 137" can be incorporated in a single integrated circuit chip of reduced size. Further, as explained in an article by Eric R. Fossum entitled *Digital Camera System on a Chip*, IEEE Computer Society (IEEE Micro), Volume 18, Number 3, May/June 1998, image sensor 132, signal processing components 135, 136, and components 142, 144, 146, 147, 137, 137', and 137" may be incorporated in a single integrated circuit of reduced size.

Figures 2A, 2B:
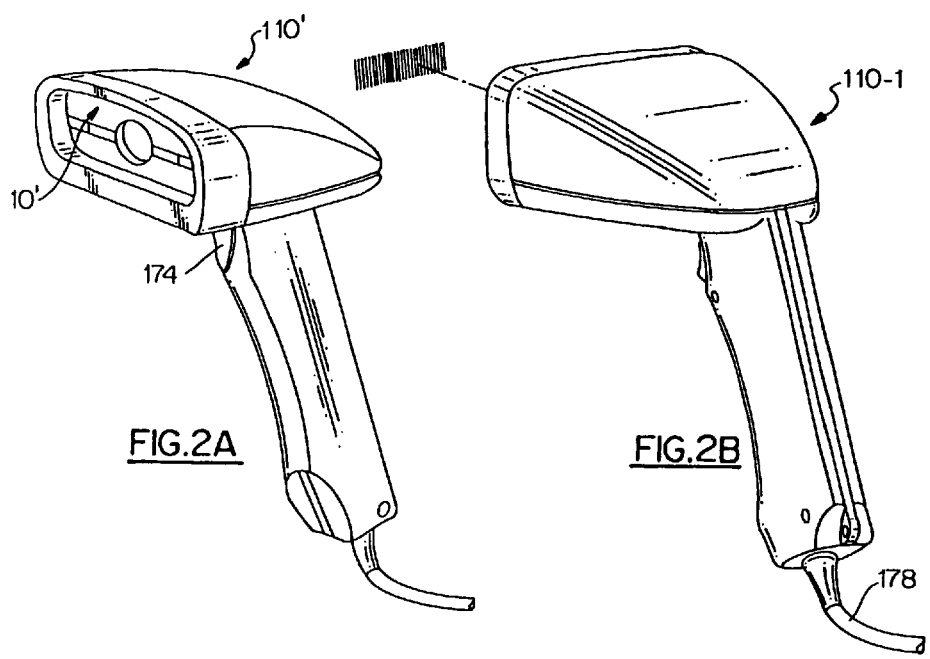
Figures 2C, 2D:
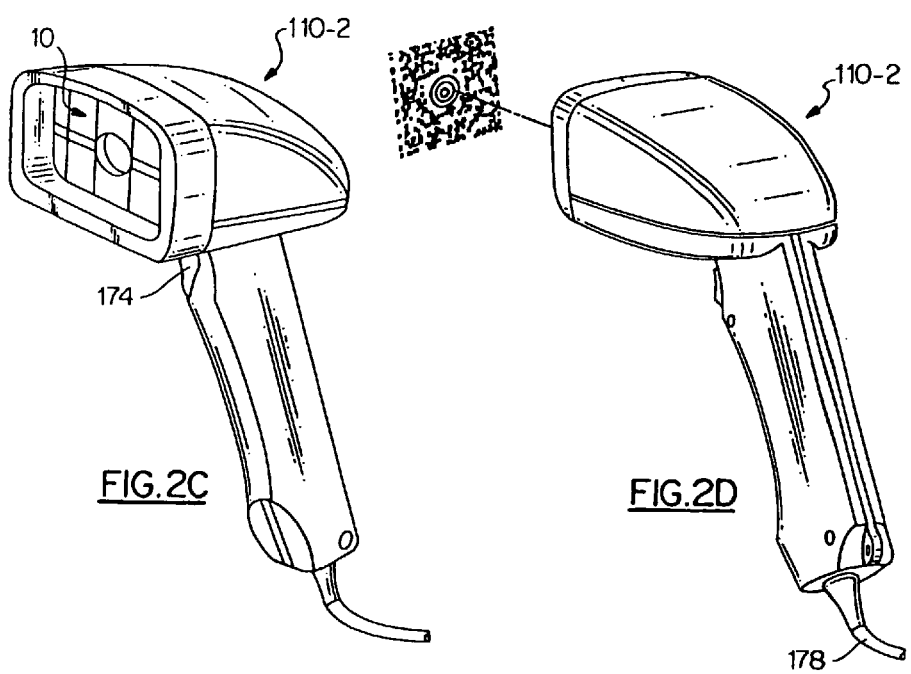
Figure 2E:
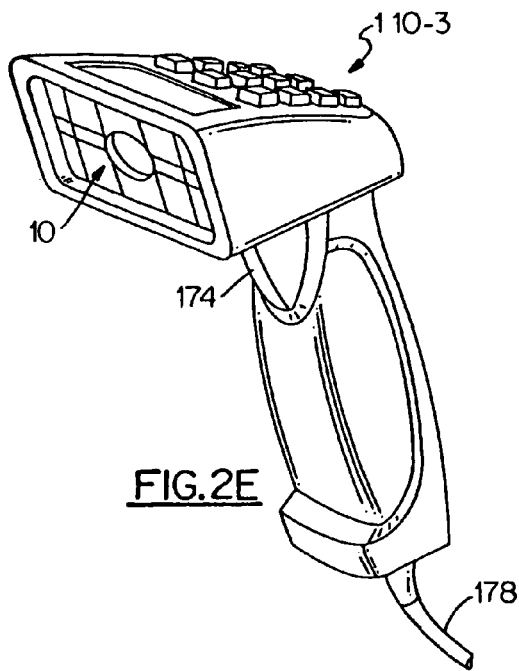
Figure 2F:
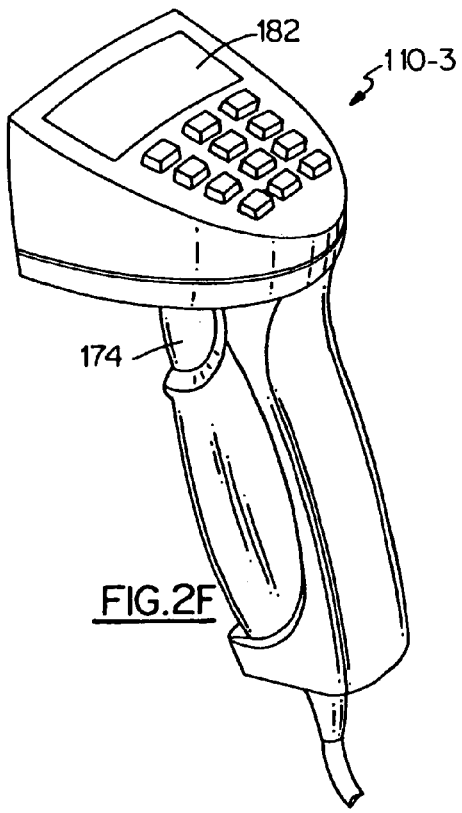
Figure 2G:
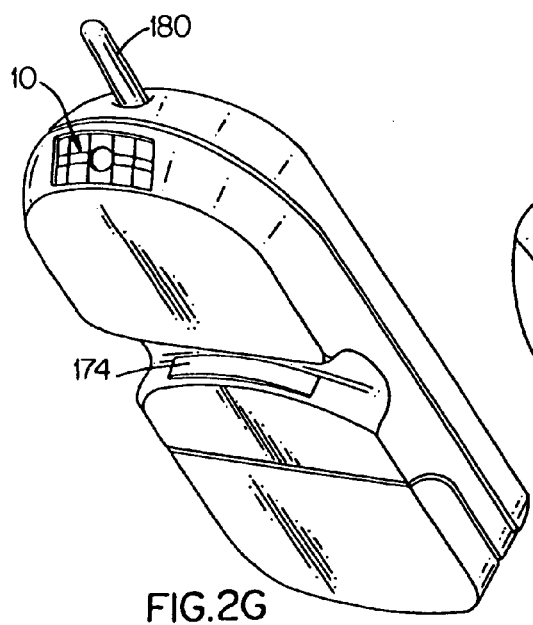
Figure 2H:
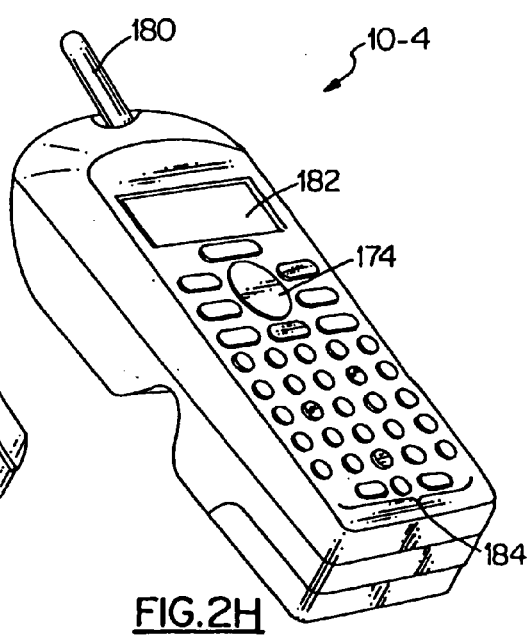
Figure 21:
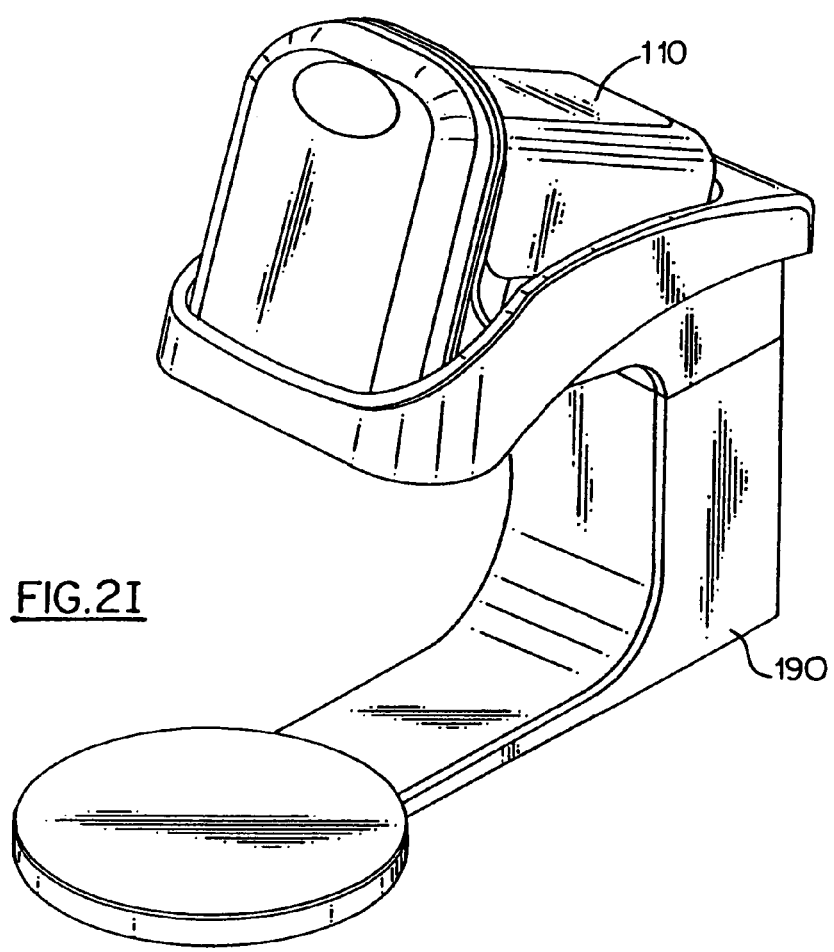

FIGS. 2A through 2H show examples of types of housings in which the present invention may be incorporated. FIGS. 2A and 2B show a 1D optical reader 110-1, while FIGS. 2C–2H show 2D optical readers 110-2, 110-3, 110-4. Housing 112 of each of the optical readers 110-1 through 110-4 has incorporated therein is adapted to be graspable by a human hand and at least one trigger switch 174 for activating image capture and decoding and/or image capture and character recognition operations. Readers 110-1, 110-2, 110-3 include hard-wired communication links 178 for communication with external devices such as other data collection devices or a host processor, while reader 110-4 includes an antenna 180 for providing wireless communication with an external device such as another data collection device or a host processor.

In addition to the above elements, readers 110-3 and 110-4 each include a display 182 for displaying information to a user and a keyboard 184 for enabling a user to input commands and data into the reader.

Any one of the readers described with reference to FIGS. 2A through 2H may be mounted in a stationary position as is illustrated in FIG. 2I showing a generic optical reader 110 docked in a scan stand 190. Scan stand 190 adapts portable optical reader 110 for presentation mode scanning. In a presentation mode, reader 110 is held in a stationary position and an indica bearing article is moved across the field of view of reader 110.

While this invention has been described in detail with reference to a preferred embodiment, it should be appreciated that the present invention is not limited to that precise embodiment. Rather, in view of the present disclosure which describes the best mode for practicing the invention, many modifications and variations would present themselves to those skilled in the art without departing from the scope and spirit of this invention, as defined in the following claims.

What is claimed is:

1. An optical reader comprising:
    a printed circuit board;
    a image sensor mounted on said printed circuit board, said image sensor having a field of view, said image sensor adapted to generate an electrical signal representative of the field of view of said image sensor;
    a signal processing circuit disposed to receive said electrical signal from said image sensor, said signal processing circuit mounted on said printed circuit board;
    an image capture circuit adapted to receive electrical signal from said signal processing circuit and store said electrical signal, said image capture circuit mounted on said printed circuit board;
    an image decoding and/or recognition circuit coupled to said image capture circuit, said image decoding and/or recognition circuit mounted on said printed circuit board;
    at least one light source mounted on said printed circuit board, said at least one light source disposed to illuminate at least a portion of the field of view of said image sensor; and
    a control circuit coupled to said image sensor
    wherein said control circuit is adapted to control the operation of said image sensor.

2. The optical reader of claim 1, wherein said at least one light source is configured to project a single aiming line.

3. The optical reader of claim 1, wherein said optical reader has a plurality of light emitting diodes, each of said light emitting diodes being mounted on said printed circuit board which further has mounted therein said image sensor, wherein said optical reader is adapted so that light from said light emitting diodes is shaped to project first and second distinct patterns of light onto a target corresponding to said field of view, wherein said first pattern of light is delimited by top and bottom borders, and wherein said second pattern of light consists of a single horizontal line of light extending horizontally across an area delimited by said first pattern of light, said second pattern of light being spaced from both of said top and bottom borders and being devoid of vertically extending light pattern elements.

4. The optical reader of claim 1, wherein said optical reader further comprises a diffuser plate disposed to receive at least a portion of the light emitted from said at least one light source.

5. The optical reader of claim 1, wherein said at least one light source is provided by a plurality of light emitting diodes.

6. The optical reader of claim 1, wherein said image capture circuit and said image decoding and/or recognition circuit commonly mounted to said printed circuit board are integrated into a common IC.

7. The optical reader of claim 1, wherein said optical reader is adapted so that said optical reader projects both an aiming pattern and an illumination pattern onto a target corresponding to said field of view.

8. The optical reader of claim 1, wherein said optical reader is adapted so that said optical reader projects both an aiming pattern and an illumination pattern onto a target corresponding to said field of view, and wherein the aiming pattern comprises a horizontal line.

9. The optical reader of claim 1, wherein said at least one light source is an illumination light source.

10. The optical reader of claim 1, wherein said at least one light source includes at least one illumination light source and at least one aiming light source.

11. The optical reader of claim 1, wherein said optical reader includes an aiming assembly having a plurality of light sources, and wherein the plurality of light sources of said aiming assembly consist of two light emitting diodes.

12. An optical reader comprising:
a mounting frame, said mounting frame including:
a back plate; and
four sidewalls extending outwards from said back plate;
wherein said back plate and said four side walls define an interior volume; and
wherein said back plate defines a plurality of openings;
a printed circuit board coupled to said back plate, wherein said printed circuit board is external to said interior volume;
an image sensor mounted on said printed circuit board, said image sensor disposed such that the field of view of said image sensor faces said interior volume;
at least one light source disposed within said interior volume, said at least one light source mounted on said printed circuit board;
a control circuit for controlling the operation of said image sensor and said control circuit disposed on said printed circuit board, said control circuit coupled to said image sensor;
a signal processing circuit disposed to receive an electrical signal from said image sensor, said signal processing circuit mounted on said printed circuit board;
an image capture circuit adapted to receive the electrical signal from said signal processing circuit and store said electrical signal, said image capture circuit mounted on said printed circuit board; and
an image decoding and/or recognition circuit coupled to said image capture circuit, said image decoding and/or recognition circuit mounted on said printed circuit board.

13. The optical reader of claim 12 further including a receive optics lens assembly coupled to said back plate.

14. The optical reader of claim 13 further including:
a diffuser plate engageable with at least two of said four side walls; and
a aiming lens aperture plate disposed between said diffuser plate and said back plate.

15. The optical reader of claim 14 wherein said at least one light source includes a plurality of light sources.

16. The optical reader of claim 15 wherein said plurality of light sources includes a plurality of light emitting diodes.

17. The optical reader of claim 15 wherein said image sensor is a solid state image sensor and said back plate defines a recess for receiving said solid state image sensor.

18. The optical reader of claim 15 wherein at least one of said at least two of said at least four sidewalls includes a resilient finger engageable with said diffuser plate.

19. An optical reader comprising:
a mounting frame, said mounting frame including:
a back plate; and
four sidewalls extending outwards from said back plate;
wherein said back plate and said four side walls define an interior volume; and
wherein said back plate defines a plurality of openings;
a printed circuit board coupled to said back plate, wherein said printed circuit board is external to said interior volume;
an image sensor mounted on said printed circuit board, said image sensor disposed such that the field of view of said image sensor faces said interior volume;
at least one light source provided by a plurality of light emitting diodes disposed within said interior volume, said plurality of light emitting diodes mounted on said printed circuit board;
a control circuit for controlling the operation of said image sensor said control circuit disposed on said printed circuit board, said control circuit coupled to said image sensor;
a signal processing circuit disposed to receive an electrical signal from said image sensor, said signal processing circuit mounted on said printed circuit board;
an image capture circuit adapted to receive the electrical signal from said signal processing circuit and store said electrical signal, said image capture circuit mounted on said printed circuit board; and
an image decoding and/or recognition circuit coupled to said image capture circuit, said image decoding and/or recognition circuit mounted on said printed circuit board.

20. The optical reader of claim 19 further including a receive optics lens assembly coupled to said back plate.

21. The optical reader of claim 20 further including:
a diffuser plate engageable with at least two of said four side walls; and
an aiming lens aperture plate disposed between said diffuser plate and said back plate.

22. The optical reader of claim 21 wherein said image sensor is a solid state image sensor and said back plate defines a recess for receiving said solid state image sensor.

23. The optical reader of claim 21 wherein at least one of said at least two of said at least four sidewalls includes a resilient finger engageable with said diffuser plate.

24. The optical reader of claim 19, wherein said optical reader has a plurality of light emitting diodes, each of said light emitting diodes being mounted on said printed circuit board which further has mounted therein said image sensor, wherein said optical reader is adapted so that light from said light emitting diodes is shaped to project first and second distinct patterns of light onto a target corresponding to said field of view, wherein said first pattern of light is delimited by top and bottom borders, and wherein said second pattern of light consists of a single horizontal line of light extending horizontally across an area delimited by said first pattern of light, said second pattern of light being spaced from both of said top and bottom borders and being devoid of vertically extending light pattern elements.

25. An optical reader comprising:
a mounting frame, said mounting frame including:
a back plate; and
four sidewalls extending outwards from said back plate;

wherein said back plate and said four side walls define an interior volume; and
wherein said back plate defines a plurality of openings;
a printed circuit board coupled to said back plate, wherein said printed circuit board is external to said interior volume;
an image sensor mounted on said printed circuit board, said image sensor disposed such that the field of view of said image sensor faces said interior volume;
a plurality of light emitting diodes disposed within said interior volume, said plurality of light emitting diodes mounted on said printed circuit board;
a control circuit for controlling the operation of said image sensor said control circuit disposed on said printed circuit board, said control circuit coupled to said image sensor;
a signal processing circuit disposed to receive an electrical signal from said image sensor, said signal processing circuit mounted on said printed circuit board;
an image capture circuit adapted to receive the electrical signal from said signal processing circuit and store said electrical signal, said image capture circuit mounted on said printed circuit board; and
an image decoding and/or recognition circuit coupled to said image capture circuit, said image decoding and/or recognition circuit mounted on said printed circuit board;
wherein the receive axis of said image sensor is substantially perpendicular to said printed circuit board.

26. The optical reader of claim 25 further including an aperture plate disposed proximate to said plurality of light emitting diodes, wherein said aperture plate defines a plurality of openings, wherein said plurality of openings are disposed such that at least a portion of the light emitted by said plurality of light emitting diodes is directed through said plurality of apertures.

27. The optical reader of claim 26 further comprising a diffuser plate disposed to receive at least a portion of the light emitted from said plurality of light emitting diodes.

28. The optical reader of claim 25 further including a diffuser plate coupled to said mounting frame, wherein said diffuser plate is disposed to receive at least a portion of the light emitted by said plurality of light emitting diodes.

29. The optical reader of claim 28 further including an aperture plate disposed between said diffuser plate and said plurality of light emitting diodes, wherein said aperture plate restricts the amount of light reaching said diffuser plate from said plurality of light emitting diodes.

30. The optical reader of claim 29 wherein said aperture plate defines a plurality of openings and at least a portion of said plurality of openings are aligned with at least a portion of said plurality of light emitting diodes.

31. The optical reader of claim 30 wherein said plurality of light emitting diodes includes:
at least one illumination light emitting diode; and
at least one aiming light emitting diode.

32. The optical reader of claim 31 wherein said at least one aiming light emitting diode and said aperture plate are adapted to generate a horizontal aiming pattern.

33. The optical reader of claim 32 wherein said horizontal aiming pattern includes a horizontal line of light.

34. The optical reader of claim 32 wherein said horizontal aiming pattern consists of a horizontal line of light.

35. The optical reader of claim 30 wherein said plurality of light emitting diodes includes:
a plurality of illumination light emitting diode; and
a plurality of aiming light emitting diode.

36. An optical reader comprising:
a mounting frame, said mounting frame including:
a back plate; and
four sidewalls extending outwards from said back plate;
wherein said back plate and said four side walls define an interior volume;
wherein said back plate includes an exterior surface and wherein said back plate defines a plurality of openings;
a printed circuit board coupled to said external surface;
an image sensor mounted on said printed circuit board, said image sensor disposed such that the field of view of said image sensor faces said interior volume;
at least one light source provided by a plurality of light emitting diodes disposed within said interior volume, said plurality of light emitting diodes mounted on said printed circuit board;
illumination optics disposed proximate to said plurality of light emitting diodes;
a control circuit for controlling the operation of said image sensor said control circuit disposed on said printed circuit board, said control circuit coupled to said image sensor;
a signal processing circuit disposed to receive an electrical signal from said image sensor, said signal processing circuit mounted on said printed circuit board;
an image capture circuit adapted to receive the electrical signal from said signal processing circuit and store said electrical signal, said image capture circuit mounted on said printed circuit board; and
an image decoding and/or recognition circuit coupled to said image capture circuit, said image decoding and/or recognition circuit mounted on said printed circuit board;
wherein the receive axis of said image sensor is substantially perpendicular to said printed circuit board.

37. The optical reader of claim 36, wherein said exterior surface defines a receptacle for receiving said image sensor.

38. The optical reader of claim 37, wherein said image sensor includes a lens assembly.

39. The optical reader of claim 38 wherein at least one of said plurality of openings defined by said back plate is disposed to receive said lens assembly.

40. The optical reader of claim 39 wherein at least a portion of said lens assembly is disposed within said interior volume.

41. The optical reader of claim 40 wherein each of said plurality of light emitting diodes includes a plurality of electrical leads.

42. The optical reader of claim 41 wherein the light emitting portion of each of said plurality of light emitting diodes is disposed within said interior volume; and wherein said plurality of electrical leads for each of said plurality of light emitting diodes extend from said interior volume through at least a portion of said plurality of openings defined by said back plate thereby allowing each of said plurality of electrical leads to be coupled to a respective electrical contact disposed on said printed circuit board.

43. The optical reader of claim 36 wherein said illumination optics include:
an aperture plate; and
a diffuser plate;
wherein said aperture plate includes a plurality of arcuate surfaces;
wherein each of said arcuate surfaces includes a surface having compound curvature; and
wherein each of said arcuate surfaces defines a substantially rectangular aperture.

44. The optical reader of claim 43 wherein at least two of said four side walls include resilient members adapted for coupling said diffuser plate to said mounting frame.

45. An optical reader comprising:
a mounting frame, said mounting frame including:
a back plate; and
four sidewalls extending outwards from said back plate;
wherein said back plate and said four side walls define an interior volume; and
wherein said back plate defines a plurality of openings;
a printed circuit board coupled to said external surface;
an image sensor mounted on said printed circuit board, said image sensor disposed such that the field of view of said image sensor faces said interior volume;
imaging optics coupled to said image sensor, said imaging optics at least partially disposed within said interior volume;
at least one illumination light emitting diode coupled to said printed circuit board wherein said at least one illumination light emitting diode is disposed within said interior volume;
at least one aiming light emitting diode coupled to said printed circuit board wherein said at least one aiming light emitting diode is disposed within said interior volume;
an aperture plate disposed proximate to said at least one illumination light emitting diode and said at least one aiming light emitting diode;
a diffuser plate coupled to said mounting frame, wherein said aperture plate is disposed between said aperture plate and said mounting frame, wherein said diffuser plate applies a clamping force to said aperture plate thereby holding said aperture plate in a predetermined position;
a control circuit for controlling the operation of said image sensor said control circuit disposed on said printed circuit board, said control circuit coupled to said image sensor;
a signal processing circuit disposed to receive an electrical signal from said image sensor, said signal processing circuit mounted on said printed circuit board;
an image capture circuit adapted to receive the electrical signal from said signal processing circuit and store said electrical signal, said image capture circuit mounted on said printed circuit board; and
an image decoding and/or recognition circuit coupled to said image capture circuit, said image decoding and/or recognition circuit mounted on said printed circuit board;
wherein the receive axis of said image sensor is substantially perpendicular to said printed circuit board;
wherein said aperture plate defines at least one opening for allowing light generated by said at least one illumination light emitting diode to pass through; and
wherein said aperture plate defines at least one opening for allowing light generated by said at least one aiming light emitting diode to pass through.

46. An optical reader comprising:
a printed circuit board ("PCB") on which an integrated circuit ("IC") is mounted, the PCB further comprising printed circuit wiring for receiving electrical connections from at least one component, the at least one component including a source of electrical power, the source of electrical power coupled to the IC;
an image sensor having a field of view, the image sensor adapted to generate an electrical signal representative of the field of view of the image sensor, the image sensor located within the IC;
an analog-to-digital ("A/D") converter, the A/D converter to digitize the electrical signal from the image sensor, the A/D converter electrically coupled to the image sensor and the A/D converter to convert the electrical signal from the image sensor to a digital signal, the A/D converter located within the IC;
a signal processing circuit electrically coupled to the A/D converter to receive the digital signal from the A/D converter, the signal processing circuit to process the digital signal from the A/D converter and to output a processed digital signal, the signal processing circuit located within the IC;
an image capture circuit including a memory, the image capture circuit electrically coupled to the signal processing circuit and adapted to receive the digital signal from the signal processing circuit and to store the processed digital signal in the memory, the image capture circuit located within the IC;
an image decoding and/or recognition circuit coupled to the IC, the image decoding and/or recognition circuit mounted on the PCB;
at least one light source mounted on the PCB, the at least one light source to illuminate at least a portion of the field of view of the image sensor; and
a control circuit coupled to the IC
wherein the control circuit is adapted to control the operation of the image sensor in the IC.

47. The optical reader of claim 46 wherein the image decoding and/or recognition circuit is located within the IC on the PCB.

48. The optical reader of claim 38 wherein the control circuit is located within the IC on the PCB.

* * * * *

UNITED STATES PATENT AND TRADEMARK OFFICE
CERTIFICATE OF CORRECTION

| | |
|---|---|
| PATENT NO. | : 7,296,751 B2 |
| APPLICATION NO. | : 10/613208 |
| DATED | : November 20, 2007 |
| INVENTOR(S) | : Charles P. Barber et al. |

It is certified that error appears in the above-identified patent and that said Letters Patent is hereby corrected as shown below:

In the Claims:

In Claim 45 (Column 15, Line 5). Please delete "a mounting frame, said mounting frame including:" and replace with -- a mounting frame having an external surface, said mounting frame including: --

Signed and Sealed this

Seventeenth Day of February, 2009

JOHN DOLL
*Acting Director of the United States Patent and Trademark Office*